United States Patent [19]

Rando et al.

[11] Patent Number: 4,709,372

[45] Date of Patent: Nov. 24, 1987

[54] FAST AXIAL FLOW LASER CIRCULATING SYSTEM

[75] Inventors: Joseph F. Rando, Los Altos Hills; Dale E. Koop, Sunnyvale, both of Calif.

[73] Assignee: Spectra-Physics, Inc., San Jose, Calif.

[21] Appl. No.: 811,593

[22] Filed: Dec. 19, 1985

[51] Int. Cl.$^4$ .............................................. H01S 3/22
[52] U.S. Cl. .................................... 372/58; 372/59; 372/93
[58] Field of Search ...................... 372/58, 59, 55, 93, 372/61

[56] References Cited

U.S. PATENT DOCUMENTS

| | | | |
|---|---|---|---|
| 3,528,030 | 9/1970 | Bickel et al. | 372/72 |
| 3,866,140 | 2/1975 | Hobart et al. | 372/93 |
| 4,245,195 | 1/1981 | Fahlen et al. | 372/92 |
| 4,288,756 | 9/1981 | Kaye | 372/58 |
| 4,321,558 | 3/1982 | Zappa | 372/58 |
| 4,550,409 | 10/1985 | Kaye | 372/58 X |

Primary Examiner—Eugene R. LaRoche
Assistant Examiner—Seung Ham
Attorney, Agent, or Firm—Paul Davis

[57] ABSTRACT

A fast axial flow folded laser includes a vessel which houses heat exchangers and a pump which imparts the pumping action throughout the laser. Only one housing is necessary and this housing can also be used as an optical bench for the resonator. In one embodiment a positive displacement rotary pump is utilized and a retroreflector included to mount three fold mirrors. In the folded configuration the retroreflector provides angular stability in any two orthogonal planes parallel to the laser beam.

23 Claims, 16 Drawing Figures

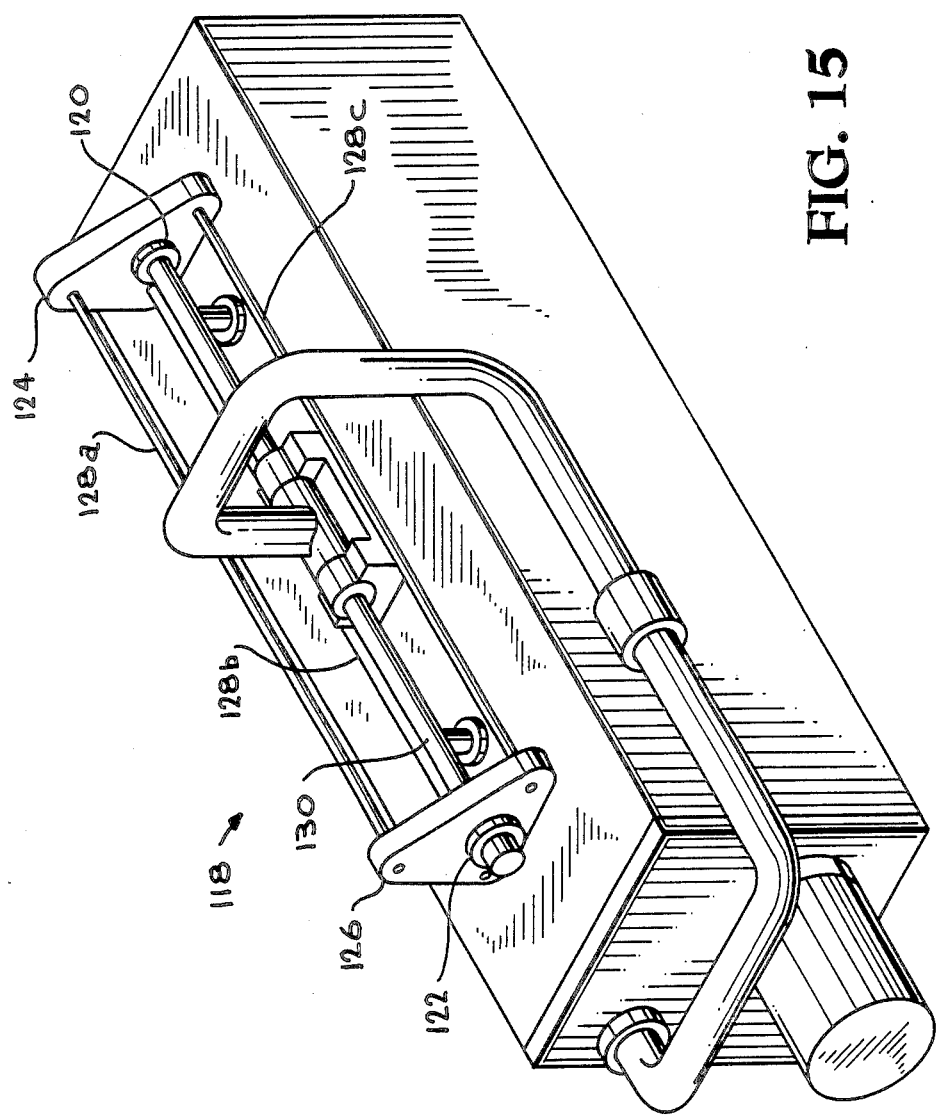

FAST AXIAL FLOW LASER CIRCULATING SYSTEM

FIELD OF THE INVENTION

This invention relates generally to an apparatus for circulating and recirculating gas in a flow system, and more particularly, to a fast axial flow folded laser.

BACKGROUND OF THE INVENTION

Power amplification and efficiency of molecular lasers, decreases with increasing temperature of the laser gas. With rising temperatures the line width becomes larger, the exicitation energy distributes among an increasing number of rotational lines, the number of deactivating collisions increases and the population of the laser end level increases by thermal excitation which results in a decrease in inversion of the individual transistions.

Methods have been developed to carry off the heat together with the laser gas by circulating and cooling the gas. Lasers appropriate for this method generally comprises an active region in which the gas is excited with a separate (downsteam) or integrated optical resonator of the gas transport system with a built-in cooler and a pump. Because large volumes of heat are carried off, large gas volumes have to be transferred by pumping. These lasers are complex and expensive.

Conventional gas transport lasers use a high-power blower, e.g. a fan or a Roots pump, for rapid gas circulation. The pump is most often operatively associated with heat exchangers, both of which require separate housings, typically at least one cast iron housing for the pump.

Depending on the arrangement of the laser resonator and the direction of gas flow, a distinction is made between transverse-flow and axial flow lasers. In a transverse-flow laser, the gas flows generally perpendicular to the axis of the laser beam and the axis of the discharge. The flow of gas in an axial flow laser is along the axis of the laser beam and the discharge.

Disadvantages of transverse flow lasers include: production of a non-symetrical beam with poorer mode quality; numerous anodes and cathodes are utilized to produce the necessary multiple discharges; and lifetime problems.

In comparison, axial flow lasers produce better beam quality, are simplier to implement and produce a desired gaussian beam in the $TEM_{00}$ mode which is very symmetric.

However, a strong and heavy Roots pump is usually necessary and is typically housed in a cast iron vessel. These pumps are designed primarily for evacuation purposes, are very bulky, have external shaft seals and complex seals for recirculating. Each side of the pump requires a heat exchanger which is generally disposed in a separate housing. This requires more seals, water fittings, vacuum flanges and are generally relatively complex mechanical configurations.

U.S. Pat. No. 4,321,558 discloses enclosing the working parts of a flowing gas laser within an airtight housing. A conventional Roots type blower is included, necessiting external shaft seals, as well as water fittings and vacuum flanges for the heat exchangers. The blower is not readily removable from the housing, is not a clean pump and thus subject to contamination, and is housed in a heavy and expensive cast iron housing. The heat exchangers require vacuum seals, heavy housings and water seals.

It would be an advancement in the art to provide a laser gas flow circulating system which utilizes a lightweight positive displacement pump with no external shaft seals, heat exchangers requiring no vacuum-tight seals and no water fittings. It would be a further advancement to provide such a gas flow circulating system in which contamination is minimized and one module is used to house a light weight displacement pump and the heat exchangers with simple ducting. This would provide for easy removal of the pump from the module without expensive disruption of relevant connections to the heat exchangers.

SUMMARY OF THE INVENTION

Accordingly, it is an object of the present invention to provide a flowing gas laser which overcomes the problems disclosed above.

Another object of the present invention is to provide a flowing gas laser which positions a pump and heat exchangers in one housing.

Yet another object of the present invention is to provide a flowing gas laser which positions pump and heat exchanger means in one housing and an optical resonater mounted at the exterior of the housing.

Still another object of the present invention is to provide a flowing gas laser whereby at least a portion of the interior of the pump and heat exchanger means housing serves as a gas manifold for the resonator.

Another object of the present invention is to provide a flowing gas laser in which a positive gas flow compression pump and two heat exchangers are positioned within a single housing.

Yet another object of the present invention is to provide a flowing gas laser whereby a positive displacement pump and two heat exchangers are mounted on a shelf which is slideably mounted and removable from the interior of the housing.

Still another object of the present invention is to provide a flowing gas laser including a single housing for the pump and heat exchangers which further serves as an optical bench whereby an optical resonator is mounted on the exterior of the housing.

A further object of the present invention is to provide a flowing gas laser which uses ducting rather than vacuum seals for connecting the pump and heat exchangers.

Another object of the present invention is to provide a flowing gas laser which is very servicable and the pump is easily removeable from the remainder of the system.

Yet another object of the present invention is to provide a flowing gas laser whereby the housing for the pump and heat exchangers further includes at least a portion of the housing which serves as a gas manifold.

Another object of the present invention is to provide a flowing gas laser which is relatively light weight.

Still a further object of the present invention is to provide a flowing gas laser in which pressure pulses are minimized.

Another object of the present invention is to provide a flowing gas laser whereby the use of vacuum-type scals associated with pump and heat exchanger components is minimized and replaced substantially with ducting.

Yet another object of the present invention is to provide a folded gas laser with a single mounting member to mount the resonator mirrors in a substantially parallel configuration as well as a retroreflector for mounting the fold mirrors.

To achieve these and other objects of the present invention, the flowing gas laser includes a gas tight housing adapted to house gas at a pressure differential existing between the interior and exterior of the housing, with the housing including at least a portion that is removable from the remainder of the housing. An optical resonator is positioned at the exterior of the housing. Heat exchanger means is disposed in the housing as well as means for introducing, circulating and expelling a fluid to and from the heat exchanger means. Positive displacement pump means is positioned in the interior of the housing and includes an inlet and outlet. Conduit means form a gas tight closed fluid path from the resonator to the heat exchanger means, from the heat exchanger means to the pump, and from the interior of the housing to the resonator. Also included is means for introducing and removing gas to and from the housing interior.

In another aspect of the present invention a flowing gas laser is provided which comprises a substantially sealed gas tight housing including at least a portion which is removeable from the remainder. An optical resonator, defining a lasing region, is positioned at the exterior of the housing. A positive displacement gas compression pump is positioned in the housing and provides enough of a differential pressure within the laser to cause movement of gases from the housing to the resonater and back to the housing in a cyclic manner. A first heat exchanger is operatively associated with the resonator and the pump. The first heat exchanger is adapted to remove thermal energy from resonator gases after they have left the resonator but before they flow through the pump. A second heat exchanger is operatively associated with the pump and removes thermal energy from the gases produced during compression while the gases pass through the pump. Conduit means create fluid communication between the resonator and the first heat exchanger, the first heat exchanger and the pump, the pump and the second heat exchanger and further provide fluid communication between the interior of the housing, where cooled gas flows from the second heat exchanger, back to the resonator.

In a further aspect of the present invention a folded gas laser includes a resonator mirror mounting member and a retroreflector mounting member positioned substantially parallel with respect to the resonator mirror mounting member. A high reflector resonator mirror and a resonator output mirror are mounted to the resonator mirror mounting member and positioned substantially parallel with respect to each other. At least two substantially parallel discharge-confining bore tubes extend to and from the mounting members and provide parallel beam paths. Three fold mirrors are mounted to the retroreflector mounting member and fold the beam paths substantially 180°.

The present invention is a flowing gas laser. In one embodiment it is a fast axial flow laser. A positive displacement pump is utilized which does not have a separate heavy cast iron housing. The heat exchangers are also not separately housed in heavy cast iron housings. Instead, the pump and heat exchangers are all housed in one vessel which is adapted to include at least one region which serves as a gas ballast. In one embodiment the pump is magnetically driven, has no external shaft seals, is made of vacuum quality materials, is light weight and is of relatively low cost. The heat exchangers and pump are respectively connected with ducting without vacuum-type fittings or water fittings.

In one embodiment of the present invention the housing is a relatively inexpensive structural steel tube with two opposing aluminum end plates attached to provide a substantially gas tight sealed environment. Gas from the resonator is pumped into a first heat exchanger in the housing, through the pump, into the second heat exchanger and then into the ballast region where it then flows back into the resonator.

The gas ballast region provides a resevoir of gas and helps to minimize pressure pulse fluctuations in the resonator. The positive displacement pump does not employ external shaft seals and there is a substantially zero pressure differential across the pump gear housing and the pump rotary members housing. Contamination of the gases flowing through the resonator is minimized.

Essentially a robust integrated package of working laser components is placed as a solid unit into a unitary cabinet. The need for separate large cast iron housings for the heat exchangers and the pump is eliminated as is the need for vacuum type plumbing seals.

A clean gas circulating system is provided with a pump designed for laser applications. The common housing (vessel) not only eliminates the need for a separate cast iron housing but also serves as a gas ballast.

Advantageously, the vessel serves as a gas ballast with a relatively large volume while the pump itself has a small pressure fluctuation. However, because the pump essentially releases flowing gas into the vessel (gas ballast) it serves as an accumulator and the pressure fluctuations of the pump are greatly reduced because the gas flows into a much greater volume than if it flowed directly into the resonator. The ballast effectively dims it out and an improvement of about 10 times is observed depending on the relative sizes of the pump and the gas ballast volumes.

In one embodiment of the present invention the pump volume is about ten percent (10%) of the ballast volume, yielding a fluctuation of about one percent (1%).

An additional advantage is that the large gas ballast volume greately reduces the need for introducing replacement lasing gas medium into the system.

The design of the present invention provides further benefits such as ease of serviceability. In one specific embodiment the pump is mounted to one of the vessel's end flanges. Removal of the end flange enables for removal of the pump without disturbing the rest of the system. In this manner the pump is easily removed for inspection, repair, oil change and the like within a few minutes and does not cause a disruption to the connecting ducting or to the resonator itself.

Because the housing can be substantially comprised of a large steel tube it can be used as a resonator support (optical bench) itself. When the housing is used as an optical bench, an aperture is formed in the vessel with the addition of appropriate conduit means to enable the housing vessel to serve as a gas manifold.

Another advantage of the present invention is its adaptability to field operation. It employs a large volume of gas and a very clean system is created in which there are substantially no hard seals. The various components are connected by ducting and the water seals to the heat exchangers are hard soddered with no water fittings.

The present invention is particularly suitable for high-power gas laser systems such as $CO_2$ fast axial flow lasers. It can be utilized with other lasers including excimers, $N_2$ and is not limited to axial flow systems.

An additional advantage of the present invention is the mounting of the resonator mirrors to a single unitary mounting block with the field mirrors being mounted to a retroreflector. The resonator mirrors are adjustably mounted to the mounting block and positioned substantially parallel with respect to each other. Utilization of the retroreflector further provides for reflection in two orthogonal dimensions and the beam paths are maintained in a substantially parallel configuration over relatively long distances.

Other and further objects of the present invention will be apparent from the following description and claims and are illustrated in the accompanying drawings which, by way of illustration, show preferred embodiments of the present invention and the principles thereof and what are now considered to be the best modes comtemplated for applying those principals. Other embodiments of the invention embodying the same or equivalent principals may be used and structural and method changes may be made as desired by those skilled in the art without departing from the present invention and the purview of the appended claims.

BRIEF DESCRIPTION OF THE DRAWINGS

FIG. 15 is a perspective view of another embodiment of the present invention illustrating a non-folded laser mounted on the housing vessel.

DESCRIPTION OF THE PREFERRED EMBODIMENTS OF THE INVENTION

The present invention is a flowing gas laser including a substantially non-leaky gas tight pressure vessel housing which is structurally constructed to withstand a pressure differential between the interior and exterior of the vessel. At least a part of the vessel includes a portion which is removable from the remainder of the vessel in order to introduce or remove different gas flow system component parts from the interior of the vessel.

Within the housing is a pump for circulating gases through a laser resonator and one or more heat exchanges. While typically in conventional gas flow systems the pump has required a separate heavy duty housing (cast iron) apart from each heat exchanger, the present invention positions these elements all in one vessel.

Figure 1:
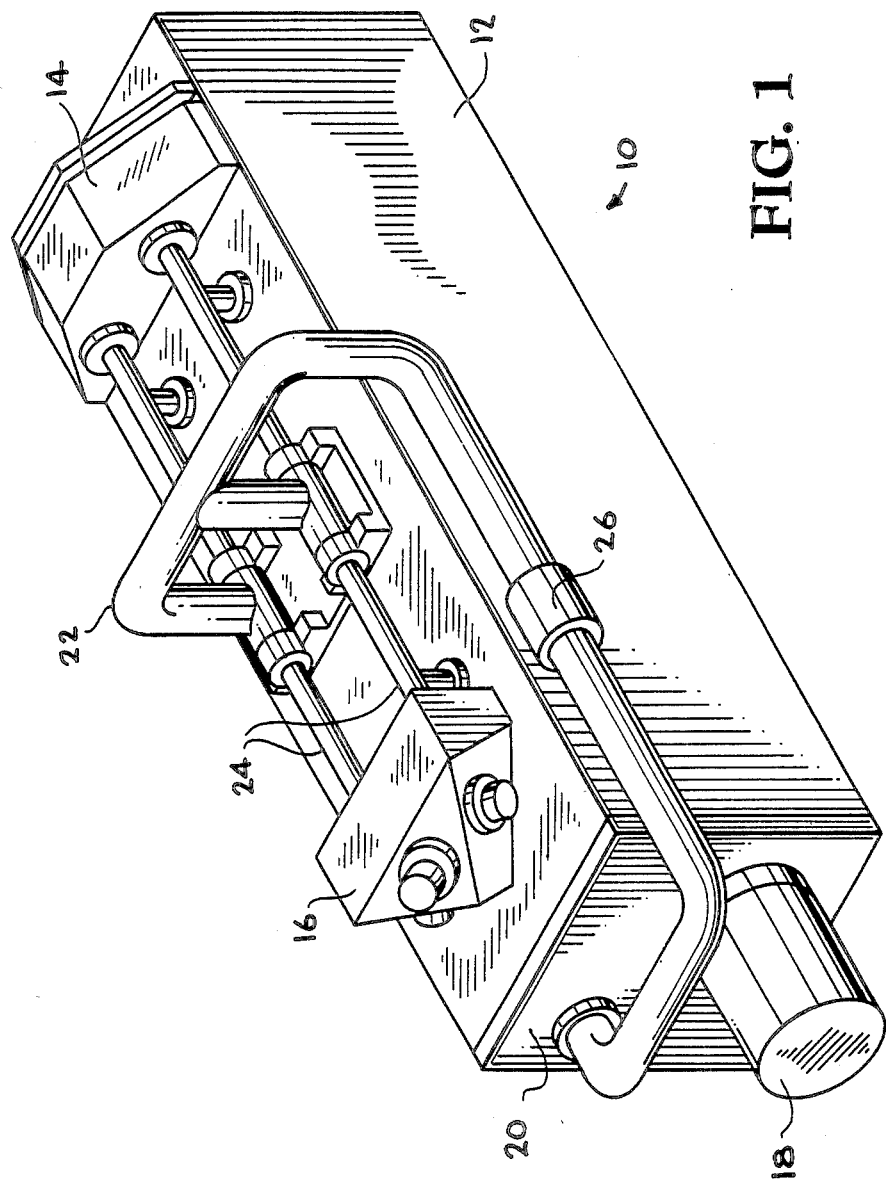
FIG. 1 is a perspective view of one embodiment of the present invention illustrating a fast axial flow laser circulating system which also serves as an optical bench for an optical resonator.

Referencing FIG. 1, the flowing gas laser is denoted generally as 10. Laser 10 can constitute different types of lasers including but not limited to fast axial flow, transverse flow, $CO_2$, $N_2$, excimer, and the like. A pressure vessel 12 singularly houses the necessary elements to pump and cool the flowing lasing medium through the resonator. Vessel 12 can be made of different materials and in one embodiment is constructed of a generally elongated rectangular structure consisting of steel with two opposing aluminum end plates. Other geometric configurations and materials are suitable, the primary requirement being that vessel 12 must withstand a pressure differential between its interior and exterior which is inherent in a flowing gas laser with pumping and cooling means being positioned within the housing operating under appropriate pressure flow conditions.

As illustrated in FIG. 1, vessel 12 can be utilized in certain embodiments as an optical bench to support an optical resonator. In one embodiment, a resonator mirror mounting block 14 and retroreflective mounting block 16 are positioned on the top of vessel 12. A pump motor 18 is attached by conventional means to end plate 20. Hot gas leaving the resonator passes through an exhaust manifold 22 after the lasing medium and other suitable gases pass through discharge tubes 24 where a population inversion occurs as the fast flowing gas is subjected to an electrical discharge. It will be appreciated that a folded assembly including four distinct discharge tubes 24 is shown in FIG. 1 but the present invention is not limited to a folded configuration or to four discharge tubes.

Exhaust manifold 22 can be one continuous piece of material including but not limited to a glass conduit, but may also be comprised of two or more pieces joined by a coupling 26. This permits removal of end plate 20 without disruption of the resonator assembly by detaching the two pieces of exhaust manifold 22 with the loosening of coupling 26.

Figure 2:
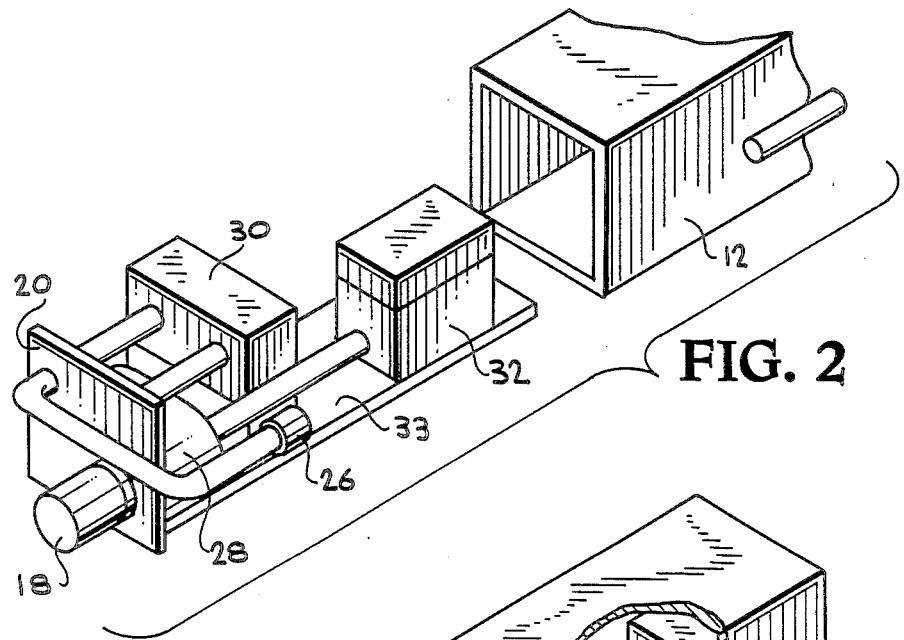
FIG. 2 is a perspective view of an embodiment of the fast axial flow circulating system illustrating a pump and two heat exchangers mounted on a shelf which in turn is slideably mounted in the interior of the vessel housing and can be completely removed therefrom.
Figure 3A:
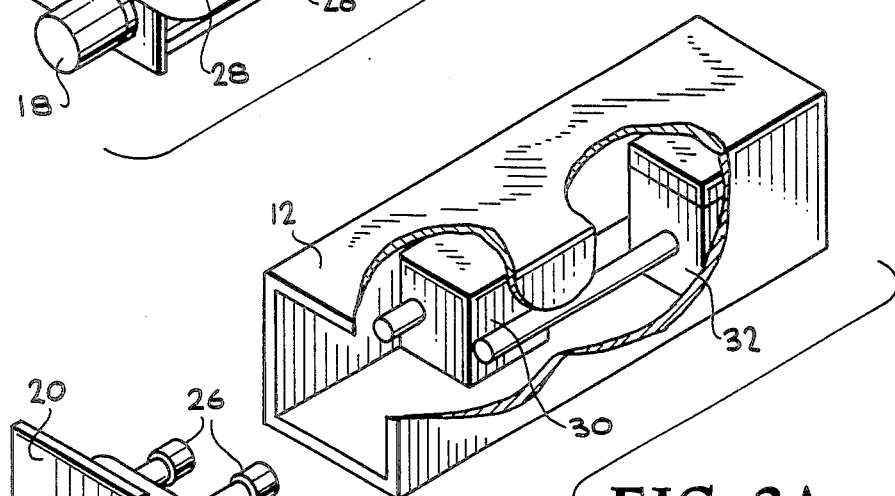
FIG. 3 is a perspective view of one embodiment of a fast axial flow circulating system and illustrates the removability of the pump from the heat exchangers in the vessel.
FIG. 3b is a perspective view of another embodiment of a fast axial flow circulating system whereby the motor powering the pump is attached to the interior wall of the vessel end plate.
Figure 14:
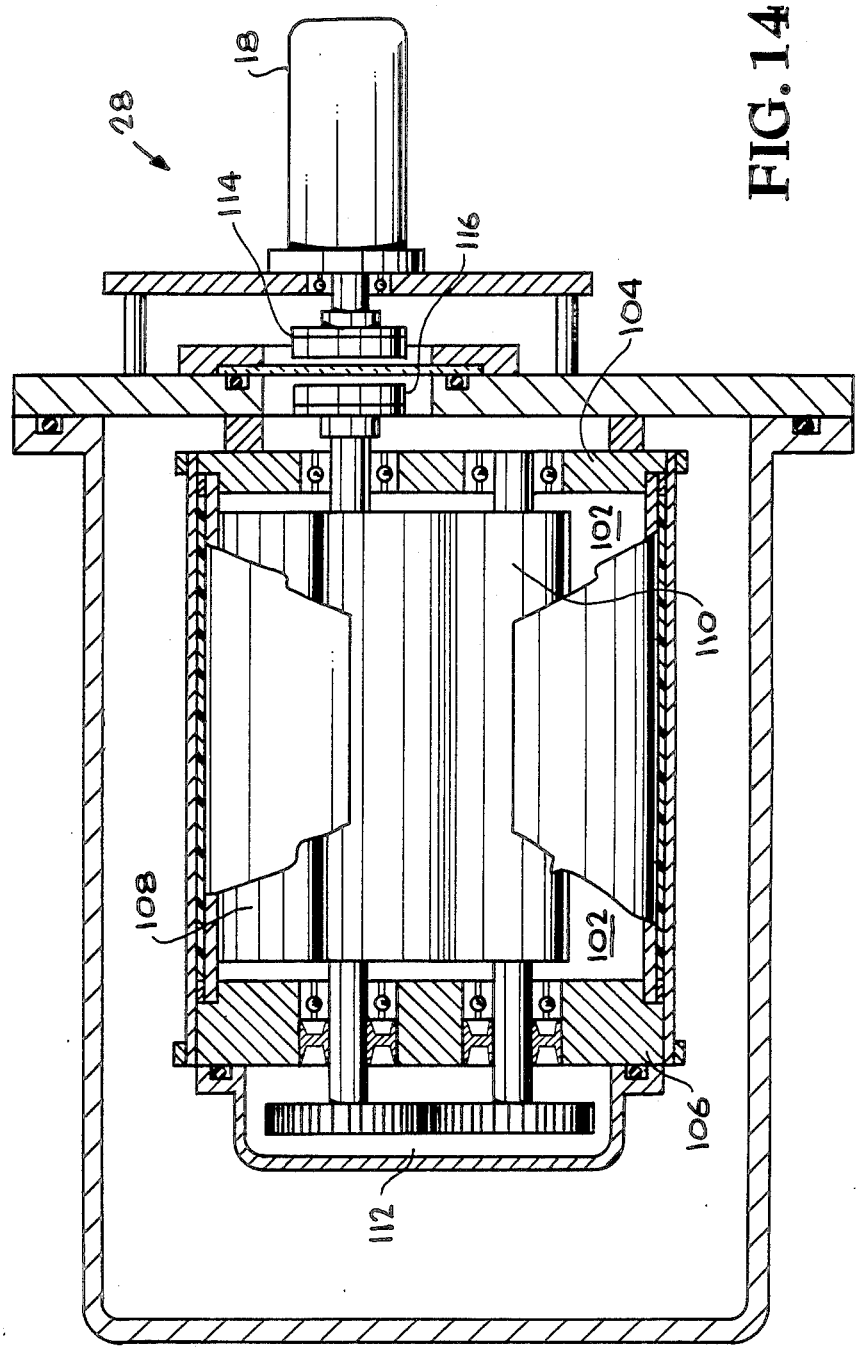
FIG. 14 is a cross-sectional view of an exemplary positive displacement rotary compression pump which can be utilized with the present invention.

FIGS. 2 and 3 illustrate certain elements positioned within vessel 12. A pump 28 is connected to a first heat changer 30. Exhaust manifold 22 is connected to first heat exchanger 30 and extends through end plate 20. Alternatively, gas manifold 22 can sealably pierce the opposing end plate. First heat exchanger 30 cools the discharge gas flowing from the resonator and can be comprised of conventional elements such as copper tubing and aluminum plates. A cooling medium is passed through the heat exchanger to remove thermal energy from the gas. A pump 28, such as a positive displacement pump serves to pump gases through the entire assembly. The preferred pump is a positive displacement pump disclosed in co-pending patent application Ser. No. 749,053 assigned to the same assignee of the present invention and fully incorporated herein by reference. FIG. 14 more fully illustrates the elements of the preferred displacement pump and is discussed in a later portion of this disclosure.

Pump 28 receives the cooled resonator gas from heat exchanger 30 and compresses it during pumping operation at which time the thermal energy of the gas increases. Operatively associated with pump 28 is a second heat exchanger 32. The purpose of second heat exchanger 32 is to remove thermal energy from the pumped gases after compression and pumping through pump 28. From heat exchanger 32 the cooled gases flow into the interior of vessel 12 which serves as a gas accumulator and gas ballast.

Heat exchangers 30 and 32 as well as pump 28 are all connected by conduits of a simple form such as ducting which is similiar to that of a vacuum cleaner.

The ducting can comprise a series of telescoping tubes with sleeve fit members to provide a gas sealed configuration while minimizing leakage of gas and permit easy removal (replacement) of pump 28 or heat exchangers 30 and 32, respectively, Exemplary materials include plastic sleeves.

As illustrated fully in FIG. 2, one embodiment of the invention positions the two heat exchangers 30 and 32 on a drawer assembly 33 which is slideably mounted within the interior of vessel 12 and can be completely removed therefrom. Pump 28 can be positioned on drawer 33, attached to end plate 20 or supported by other conventional means.

FIG. 3 shows the ease in which pump 28 can be removed from the interior of vessel 12 for maintenance, repair, oil change, clean-up and the like. Because of the simplicity of the connecting conduits, pump 28 can be easily decoupled from the two heat exchangers.

Figure 3B:
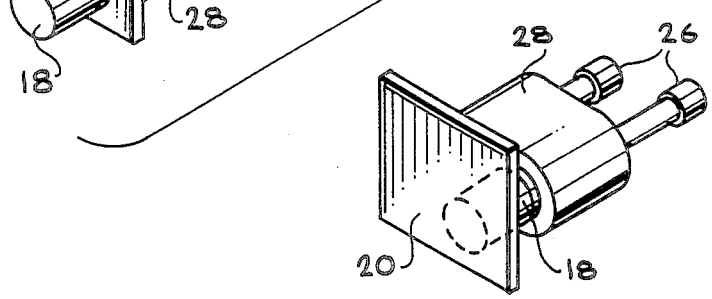

In FIG. 3b another embodiment of the invention is disclosed whereby motor 18 is mounted to the interior side of end plate 20 and is also housed within the interior of vessel 12.

Figure 4:
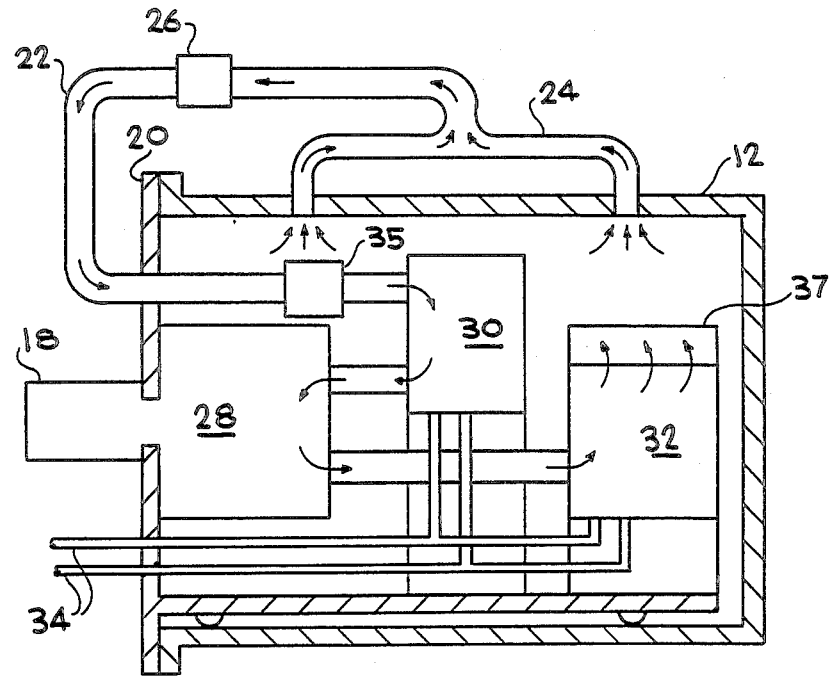
FIG. 4 illustrates a schematic view of the gas flow of the embodiment illustrated in FIG. 1.
Figure 5:
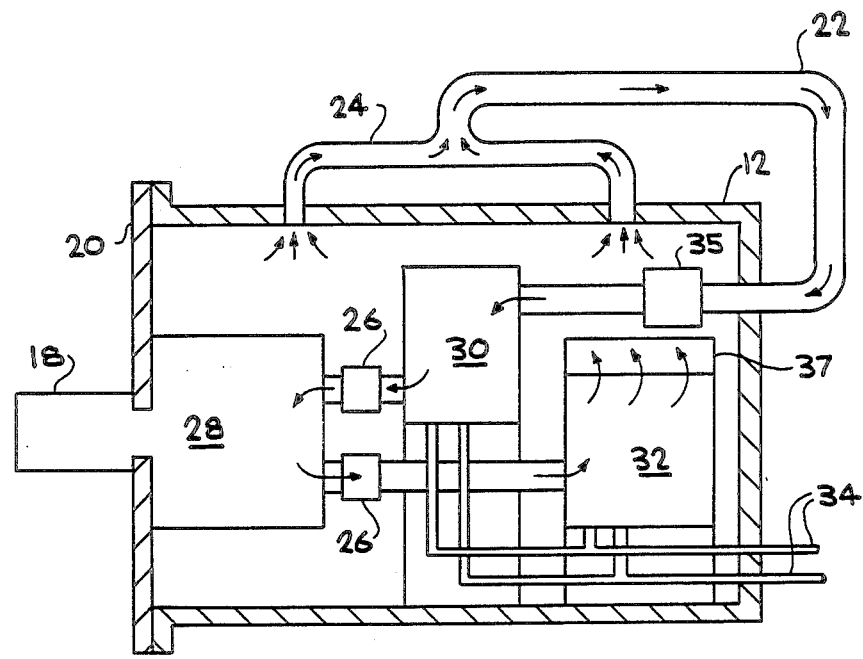
FIG. 5 is a schematic view of the gas flow of a fast axial flow circulating system similar to the one shown in FIG. 4 but differs in the positioning of the resonator gas return conduit to the end flange opposite the flange nearest the pump. The heat exchanger's water lines extend through the same flange.

Gas flow through the laser system is fully illustrated in FIGS. 4 and 5. The interior of vessel 12 serves as a gas ballast when appropriate apertures are formed within the structural components of vessel 12 and provides a means of flowing cooled gas into discharge tubes 24. Significantly, the interior of vessel 12 serves as a gas ballast and cooled gas flows freely into the interior after it leaves heat exchanger 32.

The actual volume of the interior of vessel 12 provides a relatively large gas supply for the laser. Any leakage of gas through the conduits connecting heat exchangers 30 and 32 with pump 28 is fairly insignificant since the gas will merely flow into the gas ballast. Gas returning from the resonator through gas manifold 22 is at the lower pressure end of pump 28, and in one embodiment is at a pressure of about 70 torr. In the same embodiment, pressure within the interior itself of vessel 12 is at about 140 torr, providing enough of a pressure differential to effectively provide gas circulation and recirculation through bore tubes 24 (where lasing action occurs) at a rate of greater than about 200 CFM. In one embodiment the volume of pump 28 is about 5–15% the volume of the gas ballast volume of vessel 12.

The gas experiences an increase in temperature as it flows through each discharge tube 24 and reaches a temperature of about 150°C. Heated gas flows through gas manifold 22 where the pressure is about 70 torr, comes through one of the end plates of vessel 12 via suitable gas sealed conduits and goes through a ducting into a sheet metal can where first heat exchanger 30 is positioned. This is the lower pressure side of pump 28 and eventually goes into the main volume or gas ballast region of the interior of vessel 12 which is at a pressure of about 140 torr. It will be appreciated that the pressures within the high and low sides of pump 28 are not limited to those disclosed herein but will vary according to different parameters including pump size, gas ballast volume, the rate at which the gas is pumped, the amount of gas contained within the systems, and the like.

In FIG. 5 gas returning from discharge tubes 24 (resonator) is received through the end plate opposing the end plate operatively associated with pump 28. Suitable plumbing is provided for heat exchangers 30 and 32 in order to produce the necessary cooling function. Conduits 34 are made of materials suitable for flowing a desired cooling medium to the heat exchangers which can be comprised of copper tubing disposed between sheets of aluminum. Conduits 34 are hard soldered to the respective heat exchangers. Vacuum-tight seals and water fittings are not utilized or if necessary their use is minimized.

Optionally disposed within the interior of vessel 12 is a molecular sieve 37 to absorb contaminants such as water, break down components from the lasing medium, hydrocarbons, and the like. An exemplary molecular sieve includes but is not limited to activated alumina, and the like. Also optional is a catalyst 35 disposed in the hot exhaust manifold 22. Suitable catalysts include but are not limited to platinum and other materials which can be employed to activate the reaction of broken down components of the lasing medium.

Figure 6:
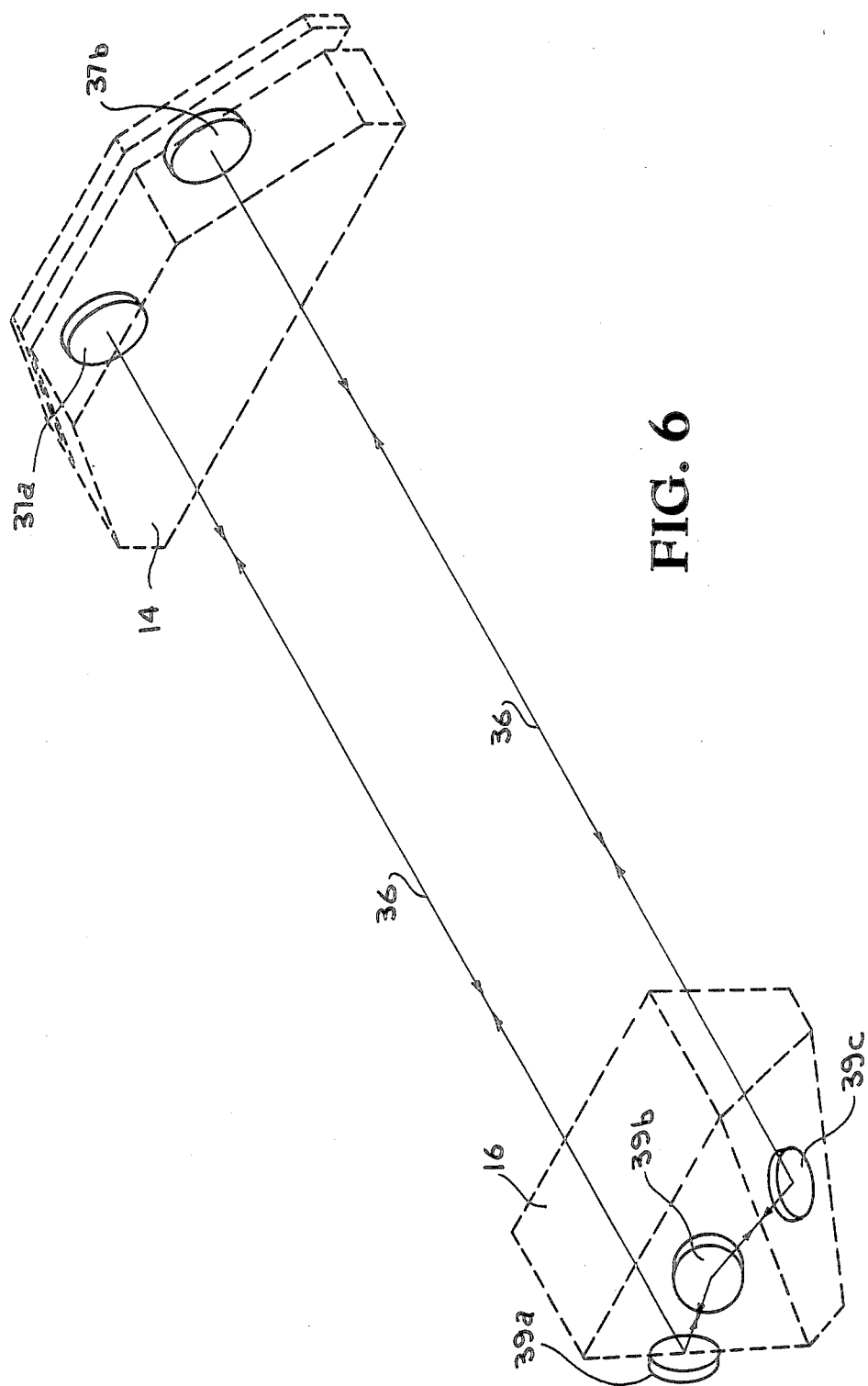
FIG. 6 illustrates schematically the path of the laser beam of the embodiment shown in FIG. 1.

Referring to FIGS. 1 and 6, the optical path or beam line 36 is illustrated in a folded laser employing at least two discharge tubes 24. In FIG. 1, there are four discharge tubes 24 along a folded path. As gas flows through the discharge tubes 24 it is preferred to maintain the temperature of the gas at less than about 200° C. For efficient lasing some mechanism is needed to remove the heat which is generated. In one embodiment the gas flows at a rate of about 200 ft $^3$/minute.

As illustrated in FIG. 6, the optical path of the generated beam is denoted as 36. Lasing within each discharge tube creates a population inversion which forms the beam. This beam travels along optical path 36 between two adjustable resonator mirrors 37a and 37b and three fold mirrors 39a, 39b and 39c. In another embodiment of the present invention the three fold mirrors can be replaced with only two fold mirrors. In yet another embodiment of the present invention the resonator does not have a folded configuration and only two opposing resonator mirrors are utilized.

Mirror mount block 14 includes a mounting block to maintain and support resonator mirrors 37a and 37b in a substantially rigid manner. The mounting block 14 is made of a material adapted to minimize thermal expansion. Resonator mirror 37a is a high reflector mirror, coated with a highly reflective coating, and has a substantially planar reflector surface. Optical path 36 is normal with respect to the planar surface of resonator mirror 37a. Resonator mirror 37b is a output coupler and is a rear leaky reflector mirror providing an overall transmission of the laser beam of about thirty percent (30%). Resonator mirror 37b is in one embodiment made of ZnSe with a reflective coating on the surface with a concave configuration having a focal length of about 10 m. The outside surface of resonator mirror 37b has an anti-reflective coating but permits an overall transmission of about thirty percent (30%). Mirrors 37a and 37b are held substantially parallel within about twenty (20) micro radians of each other.

Resonator mirrors 37a and 37b are both essentially mounted to the single mounting block 14. The three fold mirrors 39a and 39b and 39c are all mounted to retroreflector block 16. Without the retroreflector block 16, each mirror must be mounted to a separate block and the parallel paths of the laser beam in a folded configuration maintained by the use of a three bar structure with the mirrors being kinematically mounted. With such conventional mounting systems three bars are disposed longitudinally between opposing mirror mounting blocks which are water cooled and have complex structures including numerous parts. Each bar must be mounted to a mirror block, maintained at the same temperature of the other bars, and the bars must be kinematically mounted so thermal expansion and contractions do not affect the three bar structure. Additionally, it is necessary that the spacing of the bars be accurately maintained.

Retroreflector block 16 has distinct surfaces which are precisely machined and adapted to receive in a mounted relationship fold mirrors. Fold mirrors 39a, 39b and 39c can be mounted at the external surfaces of retroreflector block 16 or may be disposed and supported in rigid positions within interior sections of the block. Retroreflector block 16 is a cubed corner with mirrors 39a, 39b and 39c mounted flush onto the machined surface of the cubed corner (as recited above). In another embodiment, each mirror rests on three distinct pins adjusted at each surface so that the mirrors are all at a correct predetermined angle. Utilization of the cubed corner maintains the fold mirrors rigidly with respect to each other. Because all of the fold mirrors are on one block vibration sensitivities and thermal expansion properties are minimized. No adjustment of the mirrors, once they are in place, is necessary.

The fold mirrors 39a, 39b and 39c as mounted with respect to retroreflector block 16 reflect the incoming laser beam in three different planes such that the outgoing beam is 180° from the incoming beam. Each fold mirror 39a, 39b and 39c lies on a side of retroreflector block 16 (the cube) whereby three mirror planes from the corner of the block 16 (cube). Retroreflector 16 provides angular stability in any two orthogonal planes parallel to the laser beam.

In one embodiment, bores (permitting a free path of travel) are formed within the actual retroreflector block 16 itself.

As previously mentioned resonator mirrors 37a and 37b are distinct from conventional resonator mirror mounting structures in that both mirrors are essentially mounted on one block. This maintains a parallel relationship and the large mounting block 14 suffers little significant twist or change in shape due to thermal fluctuations. Once the two resonator mirrors 37a and 37b are mounted in a parallel configuration at the block, they remain parallel with respect to each other. Problems of maintaining this parallel relationship over a large distance are minimized.

Figure 7:
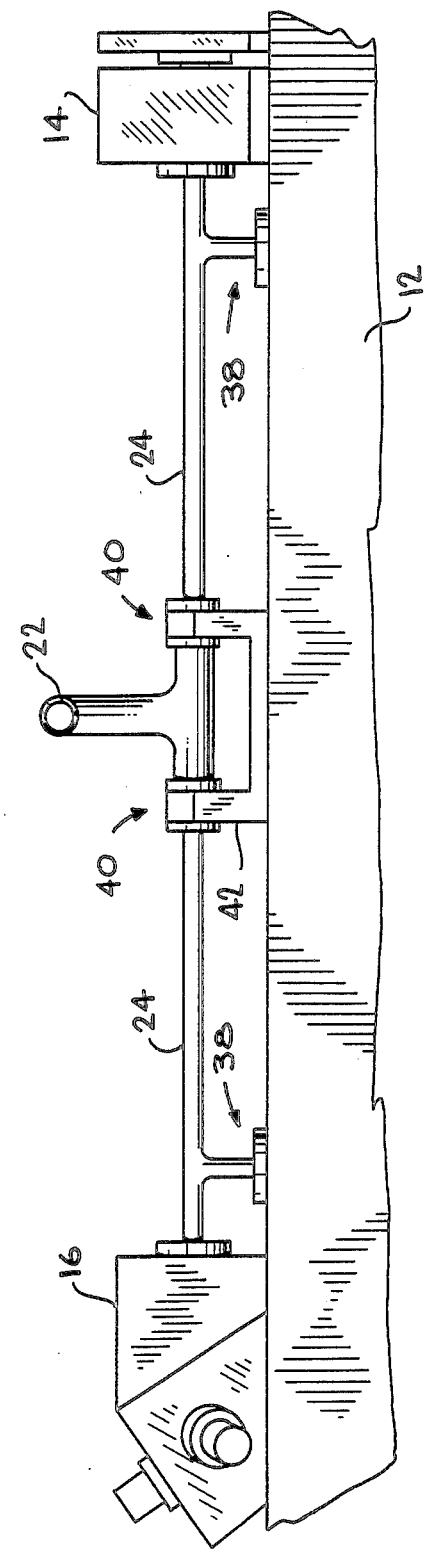
FIG. 7 is a partial side sectional view of the fast axial flow system of FIG. 1.

In FIG. 7, the relative positioning of electrodes is illustrated. As shown, anodes 38 are positioned in the resonator at one end of each discharge tube 24 with cathodes 40 positioned at opposing ends. In the embodiment of FIG. 7 the anodes are disposed substantially within the gas return path as the gas returns from the interior of vessel 12. Cathodes 40 are at opposing ends of discharge tubes 24 in proximate vicinity of exhaust manifold 22. It will be appreciated that the positioning of anodes 38 and cathodes 40 can be reversed and that the present invention is not limited to four of each. A pair of electrodes is included for each discharge tube 24; and depending upon the number of tubes, the number of electrodes will vary. Each electrode is operatively associated with a power supply, not illustrated herein, including but not limited to DC discharge, Rf power supplies and the like. A support structure 42 assists in supporting and mounting the resonator.

Figure 8:
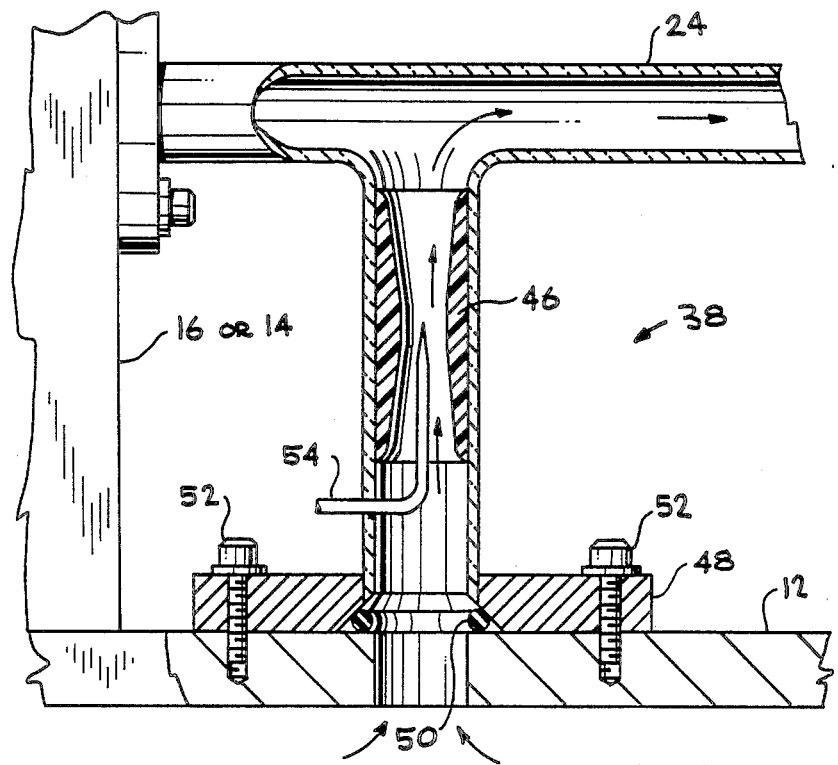
FIG. 8 is a cross-sectional view of an exemplary anode which can be utilized in an optical resonator of the present invention.
Figure 9:
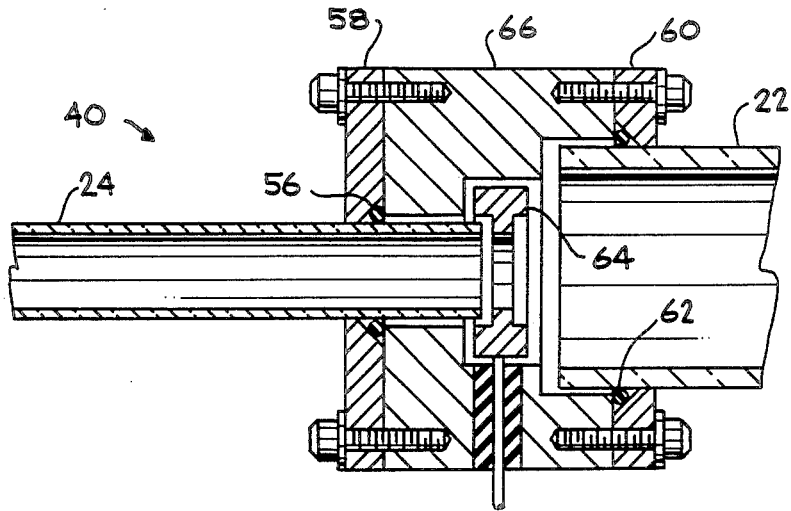
FIG. 9 is a cross-sectional view of an exemplary cathode which can be utilized in an optical resonator of the present invention.

As more fully illustrated in FIGS. 8 and 9, cross sectional views of the anode and cathode assemblies are shown. Anode assembly 38 is included to create an electrical discharge in discharge tube 24 where a flowing lasing medium undergoes a population inversion resulting in formation of a laser beam. A gas nozzle 46 provides for a desired flow path of incoming cooled gas medium. Mounting flange 48 serves to mount the resonator structure to an optical bench (in one embodiment to vessel 12).

O-ring 50 seals the resonator structure by way of flange 48 sealed to the optical bench (vessel 12). An anode pin 54 is disposed within an intake structure which receives the cooled gas medium from the gas ballast, or interior of vessel 12. Flange 48 is mounted to the optical bench by suitable retaining means such as threaded screw members 52.

In FIG. 9 an O-ring 56 seals a discharge tube end flange 58 to discharge tube 24 and a manifold end flange 60 is sealed to tube 24 by an O-ring seal 62. A stainless steel ring 64 serves as a cathode, however, the present invention is not limited to such a configuration and other cathode embodiments are suitable. Stainless steel ring 64 is also operatively associated with a suitable power supply. All are associated with a cathode body 66.

Figure 10:
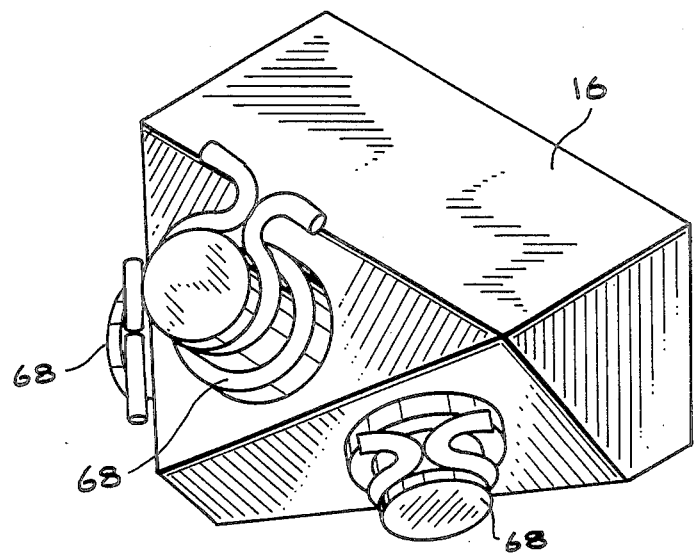
FIG. 10 is a perspective view of the retroreflector optical assembly mounted on the housing vessel as utilized in the embodiment illustrated in FIG. 1.
Figure 11:
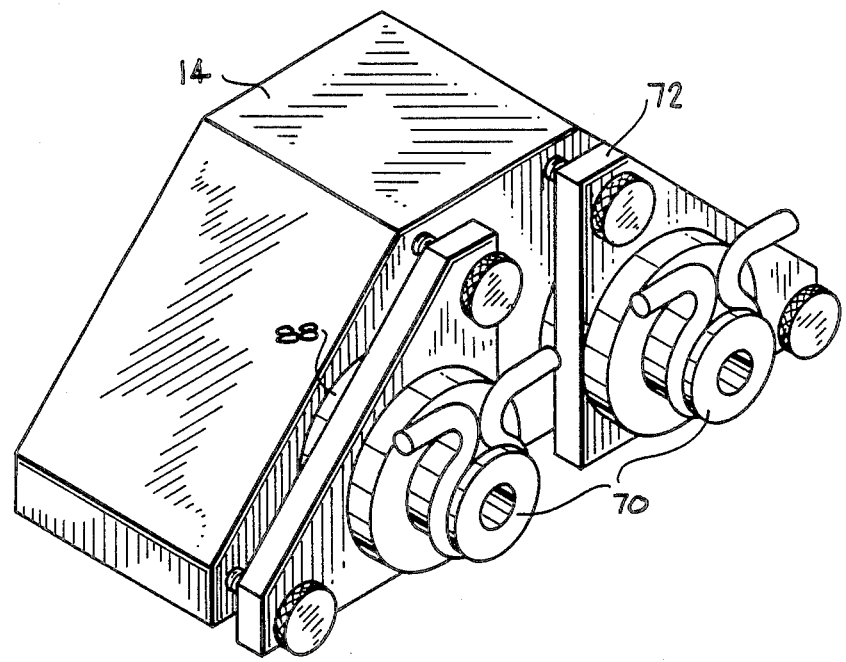
FIG. 11 is a perspective view of adjustable mirror mount assemblies mounted to a resonator mirror mounting block.

FIGS. 10 and 11 are included to show one embodiment of a folded discharge tube assembly which may be employed with the present invention.

Figure 12:
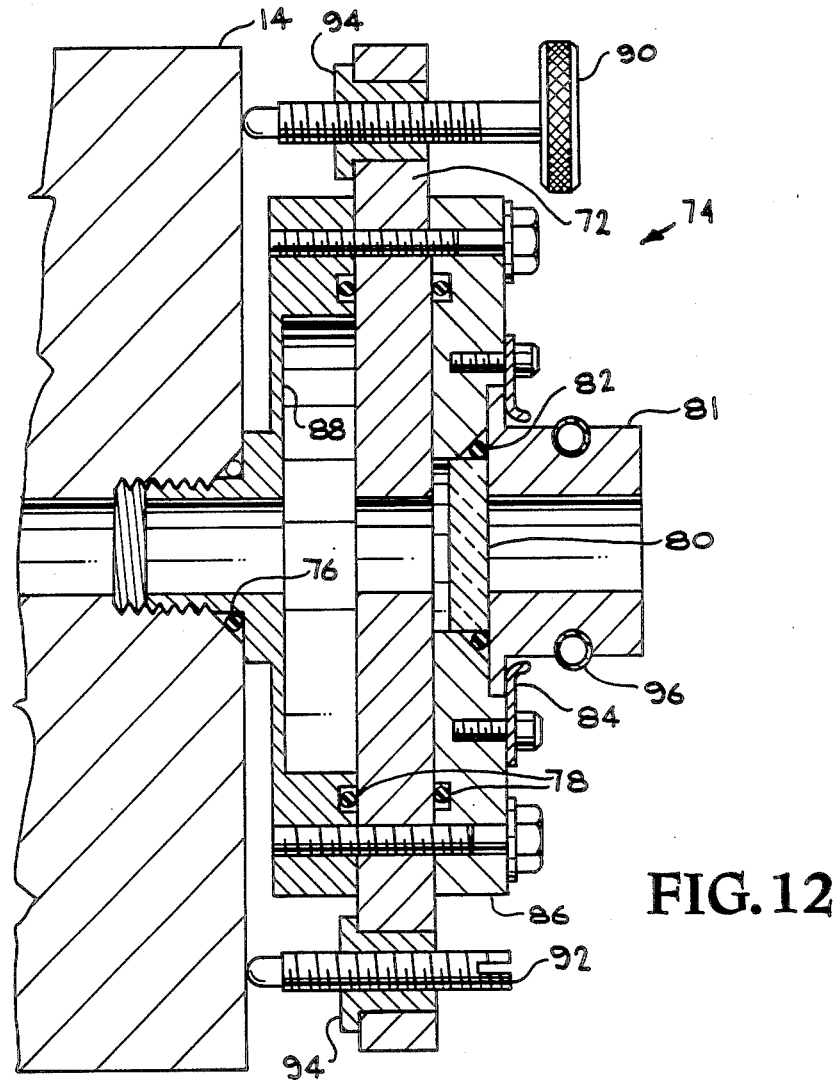
FIG. 12 is a cross-sectional view of the adjustable mirror mount assembly illustrated in FIG. 11.

Three fold mirror assemblies 68 with mirror chillers are mounted to retroreflector 16 similar to the mounting structure illustrated in FIG. 12.

As shown in FIG. 11 two resonator mirror assemblies 70 are mounted to a tilt plate mirror mount 72 which can be comprised of an exemplary material including but not limited to aluminum and the like.

Figure 13:
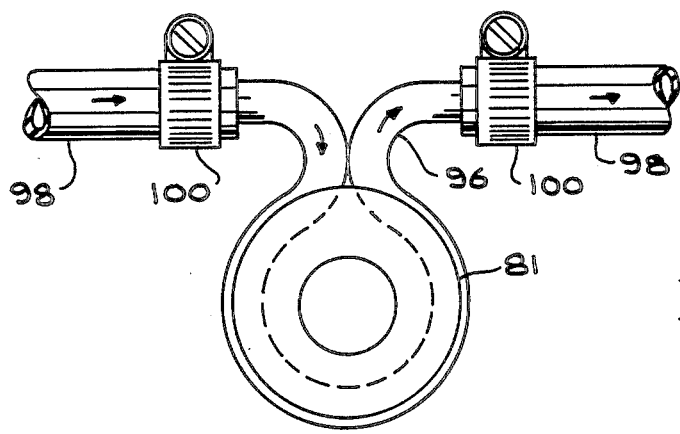
FIG. 13 illustrates schematically the mirror chiller assembly as it is utilized in the embodiments illustrated in FIGS. 10 and 11.

As more fully, set forth in FIG. 12, the entire resonator mirror assembly 74 is shown in a cross-sectional view. Tilt plate 72 is a resonator mirror mounting block which is sealably and adjustably mounted to block 14 with an O-ring 76. Further, O-ring seals 78 are also employed as shown. A chiller assembly 81 serves to cool mirror 80 (e.g., resonator mirrors 37a or 37b) and an O-ring 82 seals mirror 80 to chiller assembly 81. A spring clip mounting 84 engages chiller assembly 81 with a mirror holding flange 86. A diaphram plate 88 is flexibly mounted to block 14 to permit movement and adjustment of each mirror 80, to provide parallel beam paths. Two adjustment thumb screws 90 (only one is illustrated in FIG. 13), in combination with a pivot screw 92, are used to adjust tilt plate 72 in order for the respective resonator mirror 80 to produce the parallel beam path. Adjustment thumb screws 90 are adjusted to provide movement in the X and Y planes and pivot about a point associated with pivot screw 92. Threaded inserts 94 are in surrounding relationship with pivot screw 92 and provide a rigid mounting structure.

Referring now to FIG. 13, chiller assembly 81 includes a tubular member 96 in surrounding relationship to assembly 81 and flows a coolant medium through associated coolant hoses 98 which are coupled and attached with a clamp 100. FIG. 13 illustrates only one embodiment of chiller assembly 81 and many other different configurations are possible. Chiller assembly 81 is provided to cool resonator mirrors 80. Coolants including but not limited to water are suitable.

A pump or some kind of fan means is a necessary element of a flowing gas laser. Pump 28 illustrated in FIG. 14 is only one of many embodiments which is suitable for the purposes of practicing the present invention. The pump 28 of FIG. 14 is, however, the preferred.

Pump 28 is a sealed rotary compressor and includes a pump chamber 102 defined by first and second end plates 104 and 106 respectively, and a thin sheet metal wall member 108 disposed between first and second end plates 104 and 106, forming the enclosed sealed pump chamber 102.

Housed within chamber 102 are two rotors 108 and 110. Separate gear chamber 112 is positioned adjacent to pump chamber 102 and there is substantially no pressure differential across the two chambers. The entire assembly comprising pump 28 is housed within vessel 12. In one embodiment pump 28 is powered by pump magnet(s) 114 with drive magnet(s) 116 through the creation of a magnetic flux, with drive magnet(s) 116 being powered by a conventional AC electric motor 18.

While the present invention has been generally described in combination with a folded laser resonator, it will be appreciated that other lasers and resonators are possible. Referring now to FIG. 15 a non-folded resonator, generally denoted as 118, is mounted to vessel 12 which in this embodiment also serves as an optical bench. Positioned within the interior of vessel 12 are pump 28 and heat exchangers 30 and 32.

The resonator comprises two resonator mirrors 120 and 122 mounted to mounting assemblies 124 and 126 respectively. Alignment is assisted by the inclusion of three bar members 128a, 128b and 128c which serve to minimize thermal and stress effects on mirror alignment. Exhaust and intake manifolds introduce and remove gas to and from discharge tubes 130.

While preferred embodiments of the present invention have been illustrated and described, the invention is not limited to the precise details set forth, but should be availed to such changes and alterations as may fall within the purview of the following claims.

We claim:
1. An axial flow laser, comprising:
   a gas tight housing, without interior wall members dividing the interior of the housing, adapted to house gas at a pressure differential between the interior of the housing and the exterior of said housing including at least a portion removable from the remainder of said housing, said housing providing a gas ballast for said laser;
   an optical resonator defining a lasing region positioned at the exterior of said housing;
   heat exchanger means disposed in said housing;
   means for introducing and circulating gas to and from said heat exchanger means;
   non-diffuser positive displacement pump means disposed in the interior of said housing, said pump means including an inlet and an outlet;
   conduit means forming a gas tight closed fluid path from said resonator to said heat exchanger means from said heat exchanger to said pump means, and from said interior of said housing to said resonator; and
   means sealably introducing or removing gas to and from said housing interior.

2. The axial flow laser of claim 1, wherein said heat exchanger means comprises first and second heat exchangers, said first heat exchanger receiving gas from said resonator which then passes through said pump means and through said second heat exchanger and into the interior of said housing.

3. The axial flow laser of claim 1, wherein at least a portion of said interior of said housing provides a gas manifold for said resonator.

4. The axial flow laser of claim 1, wherein said conduit means, heat exchanger and pump means respectively are operatively associated and coupled together with non-vacuum sealing ducting.

5. The axial flow laser of claim 1, wherein said housing interior has a gas ballast volume of sufficient volume to minimize gas pressure fluctuations in said resonator.

6. The axial flow laser of claim 5, wherein said pump means has a pump volume equal to about 5–15% of said gas ballast volume.

7. The axial flow laser of claim 1, wherein said pump means is magnetically driven to imput a pump motion movement of gas.

8. The axial flow laser of claim 1, wherein said heat exchanger means is coupled to said conduit means with non-vacuum seals.

9. The axial flow laser of claim 1, wherein said heat exchanger means and said pump means are mounted on a shelf sealably mounted and removable from said interior of said housing.

10. The axial flow laser of claim 1, wherein said resonator is mounted to the exterior of said housing which is an optical bench.

11. The axial flow laser of claim 1, wherein said pump means has a sheet metal housing and further comprises a pump chamber and a gas chamber with a substantially zero-pressure differential across said chambers.

12. The axial flow laser of claim 1, further comprising catalyst means disposed in said conduit means intermediate said resonator and said heat exchanger means.

13. The axial flow laser of claim 1, wherein said catalyst in Pt.

14. The axial flow laser of claim 1, further comprising molecular sieve means disposed in said housing adapted to minimize introduction of contaminents into said resonator.

15. The axial flow laser of claim 1, wherein said housing retangular structure formed of steel and two opposing aluminum end plates sealably mounted to said rectangular structure.

16. The axial flow laser of claim 1, wherein said optical resonator has a folded configuration.

17. The axial flow laser of claim 1, further comprising power supply means operatively associated with anode and cathode members disposed in the interior of said resonator to form an electrical discharge.

18. An axial flow laser, comprising:
a sealed gas tight housing, without interior wall members dividing the interior of the housing, including at least a portion removable from the remainder of said housing, said housing providing a gas ballast for said laser;
an optical resonator disposed at the exterior of said housing defining a lasing region;
a non-diffuser positive displacement gas compression pump disposed in said housing, said pump creating a sufficient pressure differential in said laser to provide for the movement of gases from said housing to said resonator and back to said housing in a cyclic manner;
a first heat exchanger connected to said resonator and said pump, said first heat exchanger removing thermal energy from said resonator gases after said gases have left said resonator and before said gases flow into said pump;
a second heat exchanger connected to said pump to remove thermal energy produced during compression of said gases while passing through said pump; and
conduit means creating fluid communication between said resonator and said first heat exchanger, further creating fluid communication between said first heat exchanger and said pump, and between said pump and said second heat exchanger, and further creating fluid communication between said interior of said housing and said resonator.

19. The axial flow laser of claim 18, further comprising sealed means for introducing and removing gases to and from said housing interior.

20. The axial flow laser of claim 18, wherein said housing is an optical bench and said resonator is mounted on the exterior of said housing.

21. The axial flow laser of claim 18, wherein said pump means comprise a positive displacement rotary compression pump.

22. The axial flow laser of claim 18, wherein said pump means is detactably mounted with said conduit means.

23. The axial flow laser of claim 19, wherein said resonator has a folded configuration.

* * * * *